United States Patent [19]
Downie

[11] Patent Number: 5,487,225
[45] Date of Patent: Jan. 30, 1996

[54] APPARATUS AND METHOD FOR CONTROLLED DRYING OF PLASTIC PELLETS

[75] Inventor: John P. Downie, Titusville, Pa.

[73] Assignee: The Conair Group, Inc., Pittsburgh, Pa.

[21] Appl. No.: 338,418

[22] Filed: Nov. 14, 1994

[51] Int. Cl.[6] ............................... F26B 3/14; F26B 7/00
[52] U.S. Cl. ............................... 34/473; 34/491; 34/570
[58] Field of Search ............................ 34/80, 81, 60, 34/329, 330, 343, 565, 570, 472, 473, 476, 477, 491; 96/108; 95/117

[56] References Cited

U.S. PATENT DOCUMENTS

| | | | |
|---|---|---|---|
| 4,030,205 | 6/1977 | Robertson et al. | 34/60 X |
| 4,413,426 | 11/1983 | Graff | 34/27 |
| 4,468,236 | 8/1984 | Bauer | 95/117 X |
| 4,568,417 | 2/1986 | Agarwal | 34/565 X |
| 4,660,298 | 4/1987 | Nambu et al. | 34/565 X |
| 5,115,577 | 5/1992 | Kramer | 34/329 |
| 5,172,489 | 12/1992 | Moller | 34/80 X |

FOREIGN PATENT DOCUMENTS

| | | | |
|---|---|---|---|
| 6020991 | 2/1981 | Japan | 34/570 |

OTHER PUBLICATIONS

Publication "Polymer Drying" by H. E. Weckerly, Oct. 7, 1993.

*Primary Examiner*—Edward K. Look
*Assistant Examiner*—Hoang Nguyen
*Attorney, Agent, or Firm*—Buchanan Ingersoll; George Raynovich, Jr.

[57] ABSTRACT

Apparatus and a method for the controlled drying of polymer plastic pellets within a dryer hopper are provided. A sensor tree having a plurality of temperature sensors spaced vertically on the tree is positioned vertically within the dryer hopper so that the individual sensors are each located at varying vertical distances from the bottom to the top of the dryer hopper. A target temperature for a particular type of polymer plastic pellet, when maintained for a specified residence time, indicates that the pellet is thoroughly dry for use in a manufacturing process. By determining the vertical level at which the target temperature has been achieved for the desired residence time, the amount of dry material within the hopper that is ready to be input to the manufacturing process is determined. A signal processing unit operating a software program automatically controls the throughput of the dryer hopper so that only dry polymer plastic pellets leave the hopper.

20 Claims, 6 Drawing Sheets

APPARATUS AND METHOD FOR CONTROLLED DRYING OF PLASTIC PELLETS

BACKGROUND OF THE INVENTION

1. Field of the Invention

This invention relates to an apparatus and method for the controlled drying of plastic pellets that are ultimately melted and utilized to form plastic articles of manufacture. The controlled drying of the plastic pellets provides energy savings in the drying process and the properly dried pellet produces a better article of manufacture.

2. Description of the Prior Art

Dryers and dryer hoppers have been utilized in the plastics industry for many years. These dryers provide heated, dehumidified air to a dryer hopper. Plastic pellets within the dryer hopper are exposed to the heated, dehumidified air to remove moisture from the pellets. The basic purpose of drying the plastic pellets is to remove moisture from the surface and interior of the pellets before the pellets reach the melt phase as they pass through the screw area of an injection or extrusion machine. If the moisture is not removed, processing problems may occur or the quality of the finished parts may be inferior to parts which were made with properly dried material. Some properties of the parts which may be affected by inadequate drying are: tensile strength; impact strength; surface blemishes; and degradation of barrier properties. Moisture may be either on the surface of the plastic pellet or in the polymer chain itself. Hygroscopic resin absorbs moisture into polymer chain itself. Other resins hold only surface moisture. Proper heating and dehumidifying of the pellet causes the moisture to be driven out of hygroscopic resins onto the surface. Surface moisture is removed by the heated dehumidified air.

FIG. 1, which is prior art, shows a typical dryer and dryer hopper arrangement for drying plastic pellets. An insulated dryer hopper 10 is provided that has a cylindrical body 12 with a frusto conical lower body portion 14. An outlet 16 is provided at the bottom of the frusto conical lower body. At the top of the dryer hopper 10, a pellet loader 18 is typically provided to intermittently load pellets into the dryer hopper 10. The pellets move downwardly through the dryer hopper 10 in the direction of the arrows shown within hopper 10.

The dryer hopper 10 has a spreader cone 20, a heated air inlet 22 and an air outlet 24. The heated air within hopper 10 passes upwardly through the bed of pellets from inlet 22 to outlet 24 in a direction opposite the movement of pellets within the hopper.

Air from air outlet 24 typically passes through an after cooler 26 to cool the air after it leaves the dryer hopper 10. The cooled air then enters a process filter 28 to remove any dust and fines that may be entrained in the air system. Air from the process filter 28 enters blower 30 which provides a constant air flow through the drying circuit. The air then travels to the desiccant section 32 where moisture is removed from the air. The typical desiccant section 32 contains molecular sieves usually formed of Alumino-Silicates which remove the moisture from the air entering the desiccant section 32. The air then travels through the process heater 34 where it is heated to a temperature sufficient to dry pellets within the dryer hopper 10. A valve 35 controls the flow of heated air from the heater 34 to the dryer hopper 10. The process filter 28, blower 30, desiccant section 32 and process heater 34 are typically located within a dryer unit 36 that is positioned adjacent to the dryer hopper 10.

As the heated air enters the dryer hopper 10 through heated air inlet 22, it passes upwardly through the bed of pellets and the heat from the air is transferred to the pellets causing the release of moisture which is then carried to the top of the hopper with the air to air outlet 24 and the cycle is continued. This closed loop cycle continues throughout the drying process.

Efforts have been made to control the drying process within the dryer hopper 10 by controlling the temperature of the exhaust air from the hopper. U.S. Pat. No. 4,413,426 is an example of the such an arrangement.

The present invention is directed to modification of the dryer hopper 10 which will provide vertically spaced temperature sensors throughout the dryer hopper from the bottom to the top of the hopper and provide control of drying process utilizing data obtained from the vertically spaced temperature sensors.

SUMMARY OF THE INVENTION

In accordance with the present invention, there is provided in a dryer hopper for drying plastic pellets having a heated air inlet at the bottom of the hopper and an air outlet at the top of the hopper an improvement which includes a plurality of temperature sensors positioned at vertical incremental distances from the bottom of the hopper to the top of the hopper whereby the temperature of pellets at the vertical level of each of the plurality of temperature sensors may be measured to provide an indication of the dryness of the pellets at the vertical level of each of the plurality of temperature sensors.

Further in accordance with the present invention, there is provided a dryer for drying plastic pellets which includes a hopper having a cylindrical body with a frusto conical lower body portion, a spreader cone positioned within the hopper body, a heated air inlet at the bottom of the hopper and an outlet at the top of the hopper. A pellet inlet port at the top of the hopper admits pellets into the hopper and a pellet discharge port at the bottom of the hopper frusto conical lower body portion selectively discharges pellets from the hopper. A plurality of temperature sensors that provide an electrical temperature responsive signal are positioned at vertical incremental distances from the bottom of the hopper to the top of the hopper whereby the temperature of pellets at the vertical level of each of the plurality of temperature sensors may be measured to provide an indication of the dryness of the pellets. Electrical circuit means connected to the plurality of temperature sensors and to a microprocessor provide temperature data from the hopper to the microprocessor. The microprocessor is programmed with the characteristics of the hopper and the location of the temperature sensors within the hopper and is programmable to receive information on the type of plastic pellets to be dried in the hopper. The microprocessor is arranged to process the temperature data from the temperature sensors to determine when pellets at a particular vertical level within the hopper have been at a target temperature for a sufficiently long residence time to be sufficiently dry to utilize in a manufacturing process.

Still further in accordance with the present invention, there is provided a method of determining when a preselected amount of plastic pellets that are being dried by passing heated air upwardly through them within a dryer hopper are properly dry for use in a manufacturing process which includes placing a plurality of temperature sensors within the hopper in contact with the pellets at varying vertical distances from the bottom to the top of the hopper. Thereafter, determining when each of the temperature sensors reaches a specified target temperature. Thereafter, measuring the residence time at which the pellets in contact with each of the temperature sensors remain at the target temperature. Thereafter, calculating the amount of pellets in the hopper below the vertically highest positioned temperature sensor that has been maintained at the target temperature for the desired residence time to determine if the amount of pellets is equal to or greater than the preselected amount.

Accordingly, a principal object of the present invention is to provide apparatus and a method for controlled drying of plastic pellets.

Another object of the present invention is to provide apparatus for controlled drying of plastic pellets which may be built into new dryer hoppers or which may be retrofitted to dryer hoppers that are already in use.

Another object of the present invention is to provide controlled drying of pellets so that the articles manufactured from the pellets are of better quality.

Another object of the present invention is to provide for the efficient drying of plastic pellets so that the minimum amount of energy is utilized consistent with proper drying.

These and other objects of the present invention will become apparent as this description proceeds in conjunction with the following specification, attached drawings and appended claims.

DESCRIPTION OF THE PREFERRED EMBODIMENT

Figure 2:
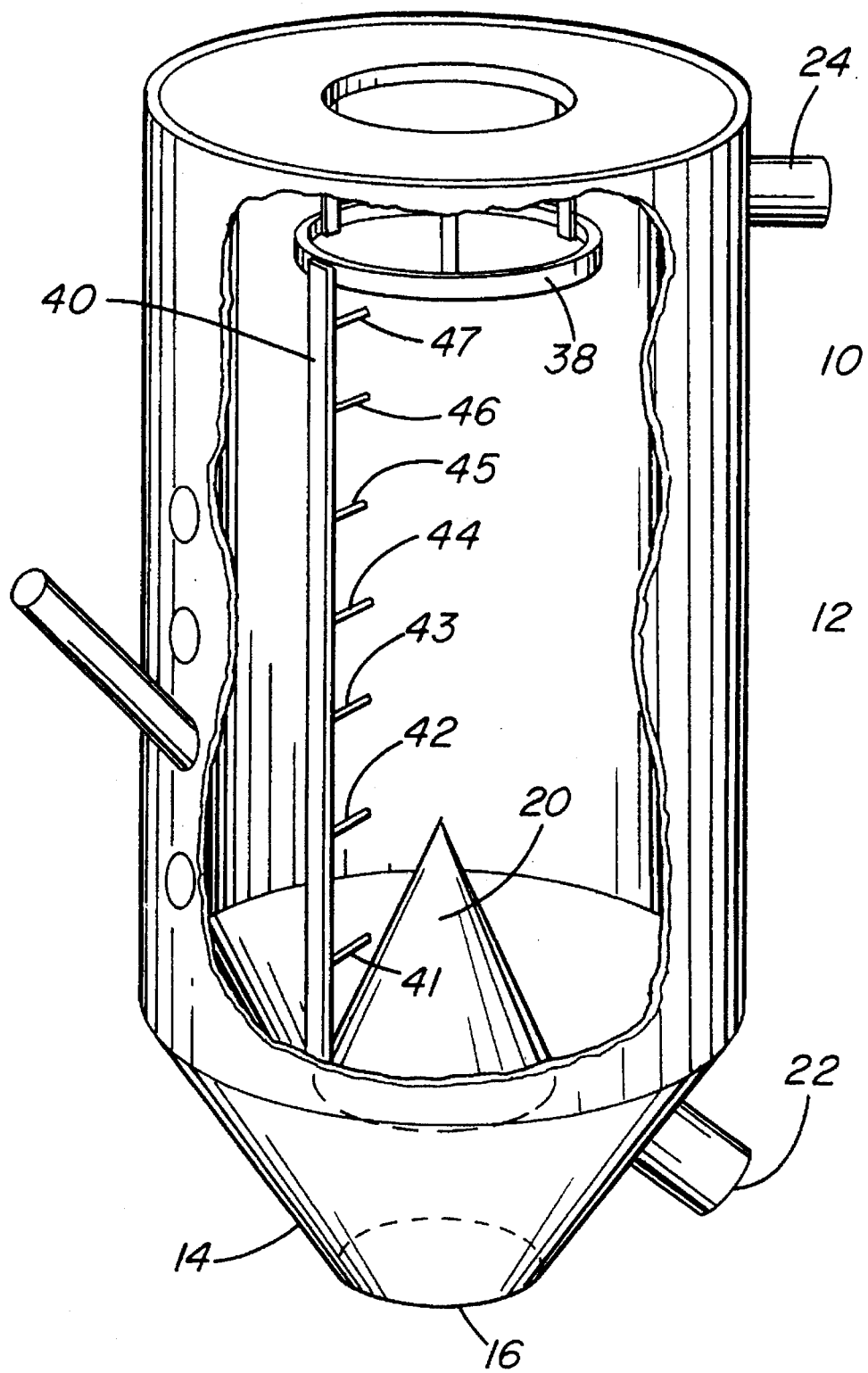
FIG. 2 is a partially cut away prospective view of a dryer hopper of the present invention with temperature sensors installed therein.

Referring to the drawings, and particularly to FIG. 2, there is shown a conventional dryer hopper 10 having an insulated cylindrical body 12 and a frusto conical lower body 14 with a valved outlet 16. A spreader cone 20 is positioned near the bottom of the cylindrical body 12.

A heated air inlet 22 admits heated air at the frusto conical lower body 14 and an air outlet 24 at the top of the cylindrical body 12 removes air from the dryer hopper 10. The dryer hopper 10 described to this point is conventional.

In accordance with the present invention, there is provided a sensor tree 40 which extends vertically from top to bottom of the dryer hopper 10. The sensor tree 40 is attached at the top 40 to a support ring 38. The sensor tree 40 has individual temperature sensors numbered, from bottom to top of the dryer hopper 10 as 41, 42, 43, 44, 45, 46 and 47, respectively. The sensors 41 through 47, inclusive, are preferably conventional thermocouple sensors which produce an electrical signal indicative of the temperature of the sensor. There may be a greater or lesser number of sensors than shown in FIG. 2 depending upon the particular process application.

Figure 3:
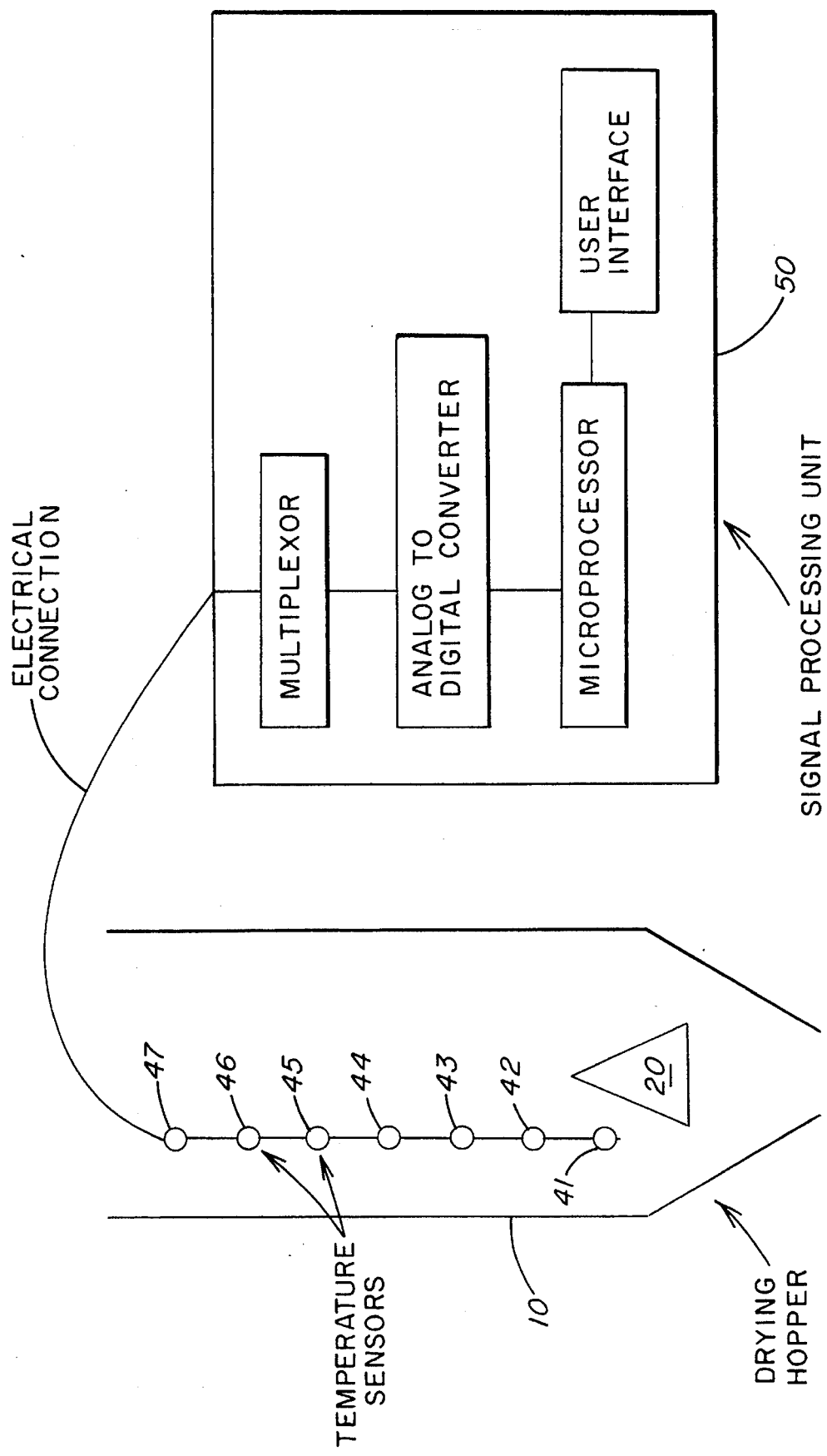
FIG. 3 is a schematic representation of the dryer hopper of the present invention with the signal processing unit utilized in conjunction with it.

As seen in FIG. 3, the temperature sensors 41 through 47, inclusive, are individually electrically connected to a signal processing unit which contains a multiplexer, an analog to digital converter, a microprocessor and a user interface.

Figure 4:
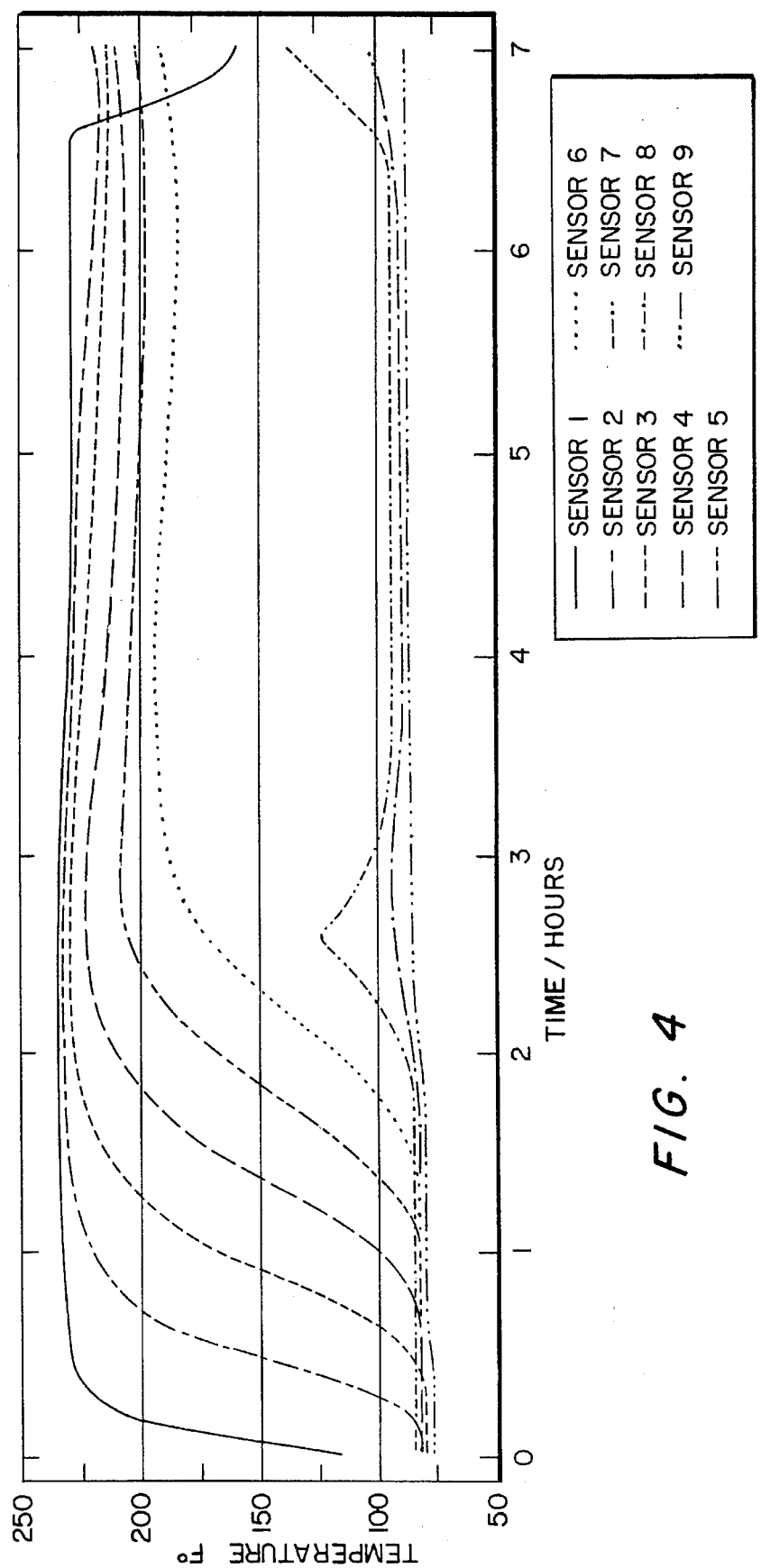
FIG. 4 is a graphic representation of the test results of drying plastic pellets within the dryer hopper of the present invention showing the data from individual sensors.

Referring to FIG. 4, there is shown a graph providing test results of a typical dryer hopper operation equipped with sensors as shown in FIGS. 2 and 3. In FIG. 4, sensor No. 1 was at the bottom of the dryer hopper and sensor No. 9 was ambient air temperature outside the hopper 10. Sensors 1 through 8, inclusive, of FIG. 4 were from the bottom to the top of the dryer hopper at approximately 6 inch intervals although the spacing may be greater or less than 6 inches depending upon the process application.

FIG. 4 shows the temperature of the sensors over time as heated air was passed upwardly through the dryer hopper and through the bed of pellets contained therein. As expected, the lowermost sensor rises in temperature most rapidly since it is first exposed to the warmest air. As the air progresses upwardly through the bed of pellets, sensors located at a higher level increase in temperature but as the air nears the top of the dryer hopper, it loses some of its effectiveness in heating the pellets so that the more highly positioned sensors 7 and 8 do not attain high temperature levels.

Depending upon the type of polymer plastic pellet that is to be dried in the dryer hopper 10, the target temperature of the pellets to be dried together with a specified residence time at that target temperature will indicate whether the pellets have achieved the proper degree of dryness for use in a manufacturing process.

For example, referring to FIGS. 2 and 3, if sensor 43 achieves the desired target temperature for the desired residence time for the type of polymer pellet being dried, it can safely be concluded that all pellets below the level of sensor 43 within the dryer hopper 10 are sufficiently dry to be utilized in the manufacturing process. Sensor 43 of FIGS. 2 and 3 equates to sensor 3 of FIG. 4.

Without more, the sensor tree 40 of FIG. 2 having the temperature sensors positioned thereon can be utilized to monitor the temperature of pellets at various vertical distances from the bottom of the dryer hopper 10 so that if the temperature at a particular vertical level of a sensor has achieved the target temperature for the type of pellets being dried and remains at that temperature for the desired residence time, the operator of the dryer hopper knows that all pellets below the level of that particular temperature sensor are sufficiently dried to be utilized in the manufacturing process.

Figure 5:
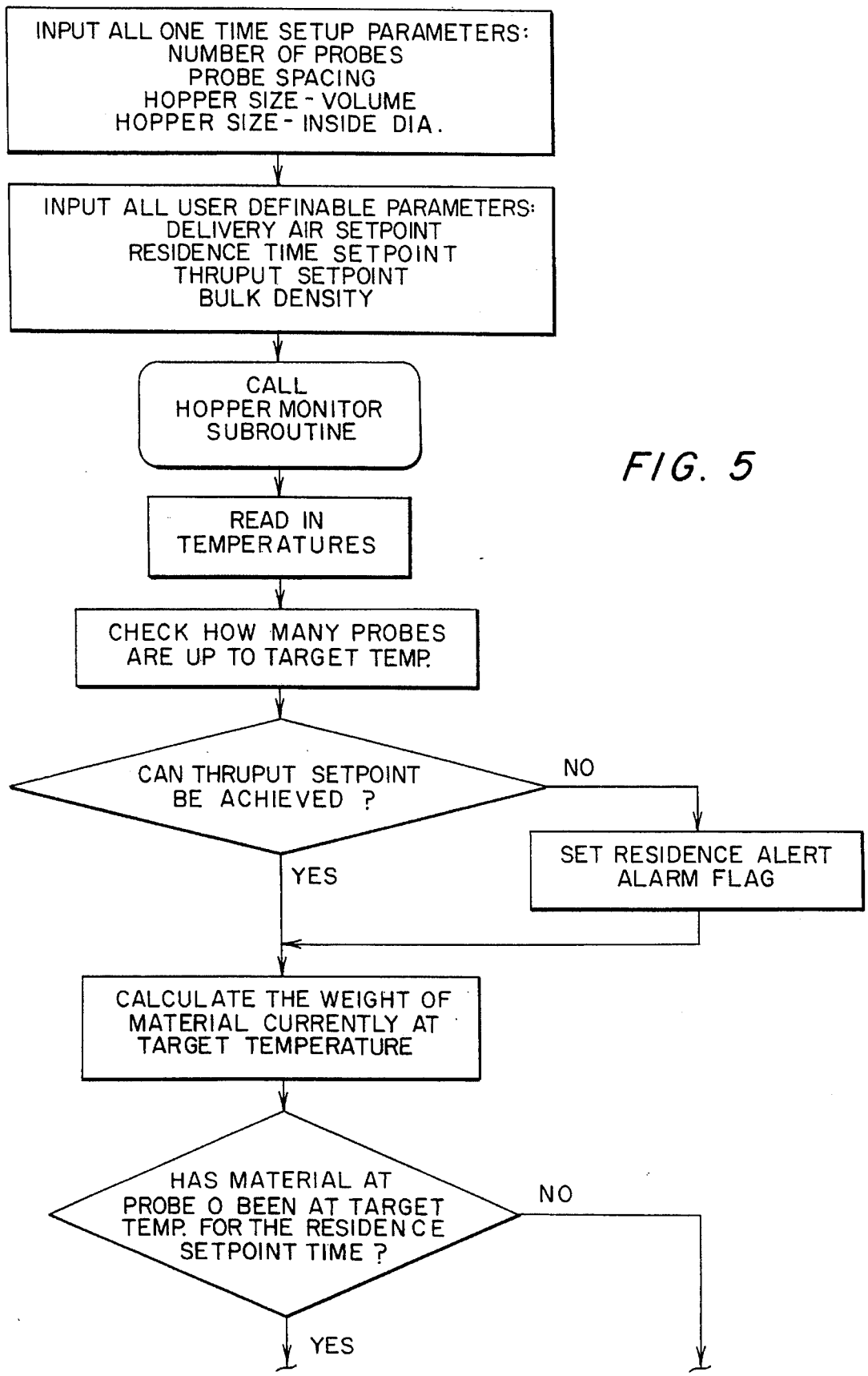
FIGS. 5 and 5A are, together, a software flow chart for the signal processing unit of the present invention.
Figure 5A:
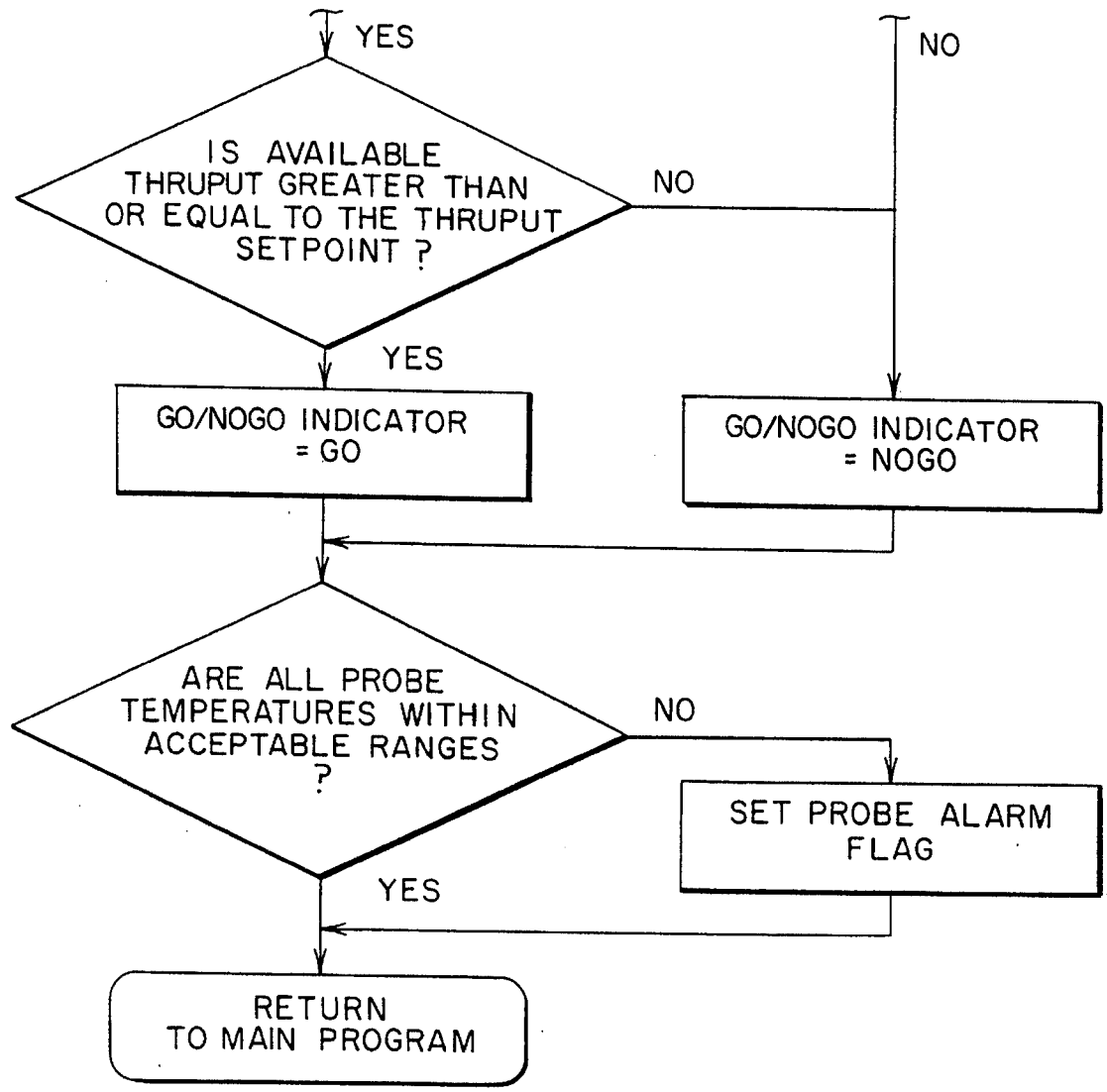

With the temperature sensors connected to the signal processing unit 50 as shown in FIG. 3, a software program has been developed so that the microprocessor can automatically control drying within the dryer hopper 10. FIGS. 5 and 5A, taken together, show the software flow chart for automatically controlling drying within the dryer hopper 10. As seen in FIG. 5, there are one-time setup parameters programmed into the microprocessor. These parameters include the number of temperature sensors or probes, the spacing of the temperature sensors or probes vertically one to the other, the hopper size volume and the inside diameter of the hopper size. These items remain constant for any particular dryer hopper 10 with the sensor tree 40 installed therein.

Utilizing the user interface, other definable parameters are introduced into the microprocessor including delivery air set point, residence time set point, throughput set point, and bulk density. The delivery air set point varies as the type of polymer plastic pellet varies. The residence time set point also varies as the type of pellet varies determining how long the residence time must persist for a particular target temperature. The throughput set point indicates the rate at which it is desired to feed pellets from the dryer hopper 10 to the manufacturing process. The bulk density is that of the pellets so that the throughput of the pellets can be calculated by weight. Once the fixed parameters and the variable parameters are introduced into the microprocessor, the microprocessor then calls in the hopper monitor subroutine and takes the data from each temperature sensor 41 through 47. The microprocessor then determines how many temperature sensors or probes are up to target temperature.

If a sufficient number of probes are up to target temperature so that the material below the highest vertically positioned temperature sensor is sufficient to achieve the desired throughput set point, the program continues. If there is not sufficient material below the highest vertically positioned sensor to achieve the desired throughput, a residence alert alarm flag becomes visible to the operator or the operation of the machine utilizing the pellets will be prevented. The program will then stay on hold until a sufficient amount of pellets are at the target temperature to achieve the desired throughput. Once this occurs, the microprocessor calculates the weight of the material currently at target temperature. The microprocessor then determines whether the material at the highest vertical sensor (probe O) has been at target temperature for the desired residence time for that particular type of plastic pellet. If the material has, the microprocessor then determines whether there is available throughput of pellets equal to or greater than the throughput set point. If the response to that inquiry by the microprocessor is in the affirmative, the program continues for so long as all probe temperatures remain within the acceptable range.

Figure 1:
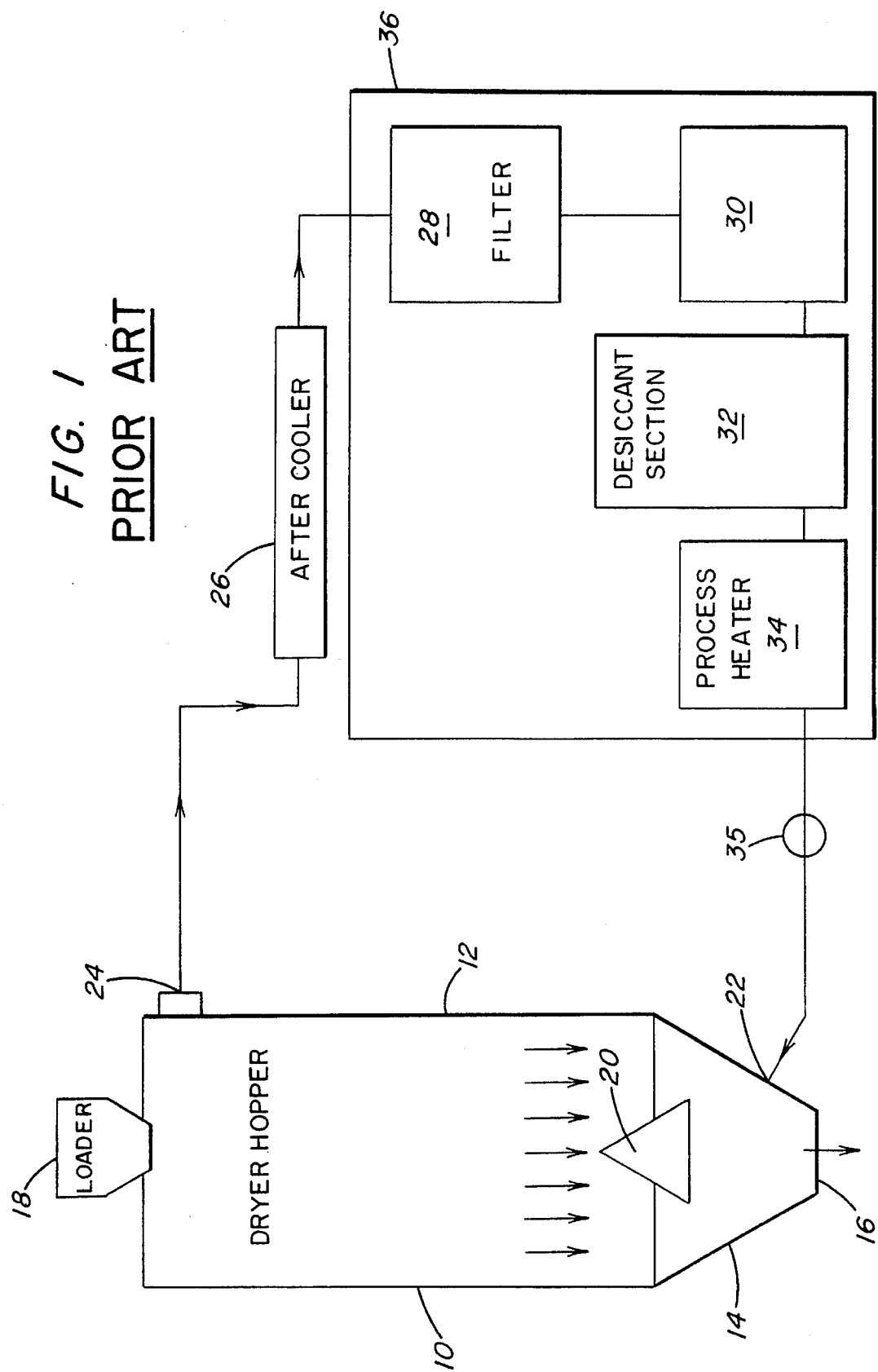
FIG. 1 is a schematic representation of a prior art dryer hopper and dryer unit.

This automatic control of the temperature within the dryer hopper 10 permits efficient use of the dryer unit 36 (FIG. 1) since if a relatively small throughput is required, the heated air does not have to be as hot or the volume of air need not be as great as that which would be required for a higher throughput. In like manner, if a particular type of plastic pellet requires a lower target temperature or a shorter residence time at that target temperature for effective drying, the heated air entering heated air inlet 22 need not be at as a high a temperature as might be necessary for pellets that required a higher target temperature or a longer residence time. Similarly, the volume of hot air entering the inlet 22 might be reduced by controlling valve 35 (FIG. 1) to reduce the flow.

It will appreciated that because many different types of polymer plastic pellets will be dried in the apparatus, and by the method, of the present invention, it is impossible to state fixed parameters for all the various types of plastic pellets. This information will be available from the supplier of the pellets and the system described herein can be adjusted accordingly to provide for efficient drying of the particular type of pellet involved.

In some instances, the calculation performed to determine whether there are sufficient dry pellets to permit the plastic injection molding or extrusion process to proceed without alarm, so that sufficient through-put is available, may indicate that a level of pellets between the vertical level of two particular sensors is required in the hopper. In such an instance, the operator may extrapolate between the readings of two contiguous sensors to determine that there are sufficient dry pellets to provide the desired through-put if the lower of the two contiguous sensors has exceeded the desired temperature and residence time but next higher sensor has not yet achieved either the desired temperature or the desired residence time. This is particularly desirable where a small number of sensors are utilized in the system.

Since overdrying of plastic pellets can sometime have an adverse effect on the quality of plastic manufactured articles, the present invention provides a system whereby the molding or extrusion process can be activated as soon as the desired temperature and residence time are achieved to indicate that the pellets are sufficiently dry. The temperature or volume of heated air entering the dryer hopper 10 can be adjusted by the system to prevent overdrying.

The sensors of the present invention can also provide an indication of the depth to which the dryer hopper 20 is filled. The temperature of the individual sensors varies as the temperature of pellets in contact with the particular sensors varies. If the hopper 10 is partially emptied so that two or three sensors 47, 46 or 45 at the top of the hopper are no longer surrounded by pellets, those sensors will register the same temperature which will be the temperature of the hopper above the pellet level. When this occurs, the operator will know that the level of pellets within the hopper is below the lowest of the plurality of sensors that record the same temperature.

It will be appreciated that the present invention can be utilized either to provide an alarm when there are not sufficient dry pellets to accommodate a specified throughput to the molding or extrusion machine or to provide for stoppage of the molding or extrusion machine when the desired through-put cannot be achieved. In either event, it will be up to the system operator to take appropriate action to provide for the desired pellet dryness.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. In a dryer hopper for drying plastic pellets having heated air passing upwardly through said hopper with an air outlet at the top of said hopper the improvement comprising:

a plurality of temperature sensors positioned at vertical incremental distances from the bottom of said hopper to the top of said hopper whereby the temperature of pellets at the vertical level of each of said plurality of temperature sensors may be measured to provide an indication of the dryness of said pellets at the vertical level of each of said plurality of temperature sensors;

said plurality of temperature sensors being connected to recording means to record the temperature of said pellets at the vertical level of each of said sensors through a specified time period; and each of said plurality of temperature sensors having a target temperature to be maintained for a specified residence time to provide dry pellets at the vertical level of each of said sensors.

2. The improvement of claim 1 wherein the residence time of pellets at said target temperature at a vertical level of a particular temperature sensor is utilized to evaluate whether pellets within said hopper below the level of said particular sensor are sufficiently dry to be utilized in a manufacturing process.

3. The improvement of claim 2 wherein removal of pellets from said hopper is prevented until all pellets below the level of said particular sensor within said hopper are sufficiently dry to be utilized in a manufacturing process.

4. The improvement of claim 2 wherein an alarm is actuated until all pellets below the level of said particular sensor within said hopper are sufficiently dry to be utilized in a manufacturing process.

5. The improvement of claim 1 wherein the temperature of said heated air may be adjusted to meet said target temperature.

6. The improvement of claim 1 wherein the volume of said heated air may be adjusted to meet said target temperature.

7. The improvement of claim 1 wherein said plurality of sensors exceeds four in number.

8. A dryer for drying plastic pellets comprising:

a hopper having a cylindrical body with a frusto-conical lower body portion, a spreader cone positioned within said hopper body, a heated air inlet at the bottom of said hopper and an air outlet at the top of said hopper;

a pellet inlet port at the top of said hopper to admit pellets into said hopper, a pellet discharge port at the bottom of said hopper frusto-conical lower body portion to selectively discharge pellets from said hopper;

a plurality of temperature sensors that provide an electrical temperature responsive signal positioned at vertical incremental distances from the bottom of said hopper to the top of said hopper whereby the temperature of pellets at the vertical level of each of said plurality of temperature sensors may be measured to provide an indication of the dryness of said pellets;

electrical circuit means connected to said plurality of temperature sensors and to a micro-processor to provide temperature data from said hopper to said micro-processor;

said micro-processor being programmed with the characteristics of said hopper and the location of said temperature sensors within said hopper, said micro-processor being programmable to receive information on the type of plastic pellets to be dried in said hopper;

said micro-processor being arranged to process said temperature data from said temperature sensors to determine when pellets at a particular vertical level within said hopper have been at a target temperature for a sufficiently long residence time to be sufficiently dry to utilize in a manufacturing process.

9. The dryer of claim 8 wherein at least one of said temperature sensors is positioned below the point of said spreader cone and at least two of said temperature sensors are positioned at varying distances above said spreader cone.

10. The dryer of claim 8 wherein said characteristics of said hopper programmed into said micro-processor include the number of said temperature sensors, the vertical spacing of said temperature sensors, the size of said hopper, and the inside diameter of said hopper.

11. The dryer of claim 8 wherein said information on the type of plastic pellets programmable into said micro-processor includes the target temperature to which said pellets are to be heated, the residence time at which said pellets are to remain at said target temperature, the bulk density of said pellets, and the desired rate of through-put of pellets from said dryer to said manufacturing process.

12. The dryer of claim 8 wherein said micro-processor is part of a signal processing unit that includes a multiplexer, an analog-to-digital convertor and a user interface.

13. The dryer of claim 12 wherein said signal processing unit determines the weight of pellets within said hopper currently at target temperature, determines whether said target temperature has been achieved for the required residence time, and provides an indication of whether said hopper contains a sufficient amount of dry pellets to achieve a desired through-put of dry pellets to said manufacturing process.

14. The dryer of claim 13 wherein said signal processing unit signals when removal of pellets from said dryer hopper may commence to provide a sufficient amount of dry pellets to achieve said desired through-put of dry pellets to said manufacturing process.

15. A dryer for drying plastic pellets comprising:

a hopper having a cylindrical body with a frusto-conical lower body portion, a spreader cone positioned within said hopper body, a heated air inlet at the bottom of said hopper and an air outlet at the top of said hopper;

a pellet inlet port at the top of said hopper to admit pellets into said hopper, a valved pellet discharge port at the bottom of said hopper frusto-conical lower body portion to selectively discharge pellets from said hopper;

a plurality of temperature sensors that provide an electrical temperature responsive signal positioned at varying vertical distances from the bottom of said frusto-conical lower body portion to the top of said hopper cylindrical body whereby the temperature of pellets at the vertical level of each of said plurality of temperature sensors may be measured;

electrical circuit means connected to said plurality of temperature sensors and to a signal processing unit to provide temperature data from said hopper to said signal processing unit, said signal processing unit including a micro-processor, a multiplexor, an analog-to-digital convertor and a user interface;

said micro-processor being programmed to include the number of said temperature sensors, the vertical position of each of said temperature sensors, the size of said hopper, and the inside diameter of said hopper;

said micro-processor being programmable to receive the target temperature to which said pellets are to be heated, the residence time at which said pellets are to remain at said target temperature, the bulk density of said pellets, and the desired rate of through-put of pellets from said dryer;

said signal processing unit being arranged to determine the weight of pellets within said hopper currently at target temperature, to determine whether said target temperature has been achieved for the required residence time, and to provide an indication of whether said hopper contains a sufficient amount of dry pellets to achieve said desired rate of through-put to a manufacturing process that said dryer is to supply with dry pellets.

16. The dryer of claim 15 wherein at least one of said temperature sensors is positioned below the point of said spreader cone and at least two of said temperature sensors are positioned at varying distances above said spreader cone.

17. The method of determining when a preselected amount of plastic pellets that are being dried by passing heated air upwardly through them within a dryer hopper are properly dry for use in a manufacturing process comprising the steps of:

placing a plurality of temperature sensors within said hopper in contact with said pellets at varying vertical distances from the bottom to the top of said hopper;

determining when each of said temperature sensors reaches a specified target temperature;

measuring the residence time at which the pellets in contact with each of said temperature sensors remains at said target temperature; and calculating the amount of pellets in said hopper below the vertically highest positioned temperature sensor that has been maintained at said target temperature for said residence time to determine if said amount is equal to or greater than said preselected amount.

18. The method of claim 17 wherein each of said plurality of temperature sensors provides an electrical temperature responsive signal.

19. The method of claim 18 wherein said temperature responsive signals are processed by a micro-processor to determine whether they have reached said target temperature.

20. The method of claim 19 wherein said temperature responsive signals are monitored by said micro-processor after they reach said target temperature to determine residence time at said target temperature.

* * * * *